United States Patent
Majkic et al.

(10) Patent No.: US 11,901,097 B2
(45) Date of Patent: Feb. 13, 2024

(54) ROUND SUPERCONDUCTOR WIRES

(71) Applicant: University of Houston System, Houston, TX (US)

(72) Inventors: Goran Majkic, Houston, TX (US); Anis Ben Yahia, Houston, TX (US); Wenbo Luo, Houston, TX (US); Venkat Selvamanickam, Houston, TX (US); Soumen Kar, Houston, TX (US)

(73) Assignees: University of Houston System, Houston, TX (US); AMPEERS LLC, Houston, TX (US)

( * ) Notice: Subject to any disclaimer, the term of this patent is extended or adjusted under 35 U.S.C. 154(b) by 464 days.

(21) Appl. No.: 17/288,838

(22) PCT Filed: Oct. 28, 2019

(86) PCT No.: PCT/US2019/058355
§ 371 (c)(1),
(2) Date: Apr. 26, 2021

(87) PCT Pub. No.: WO2020/087069
PCT Pub. Date: Apr. 30, 2020

(65) Prior Publication Data
US 2021/0358660 A1    Nov. 18, 2021

Related U.S. Application Data

(60) Provisional application No. 62/751,328, filed on Oct. 26, 2018.

(51) Int. Cl.
*H01B 12/06* (2006.01)
(52) U.S. Cl.
CPC .................. *H01B 12/06* (2013.01)

(58) Field of Classification Search
CPC ........................................ H01B 12/06
See application file for complete search history.

(56) References Cited

U.S. PATENT DOCUMENTS

| | | | | |
|---|---|---|---|---|
| 6,188,921 B1 * | 2/2001 | Otto | ................... | H10N 60/0801 |
| | | | | 505/704 |
| 6,239,079 B1 * | 5/2001 | Topchiashvili | .... | H10N 60/0268 |
| | | | | 505/705 |

(Continued)

FOREIGN PATENT DOCUMENTS

| | | |
|---|---|---|
| EP | 0463568 A2 | 1/1992 |
| WO | 2020087069 A2 | 4/2020 |

OTHER PUBLICATIONS

Kar, Soumen et al. "Symmetric tape round REBCO wire with J e (4.2K, 15 T) beyond 450 A mm-2 at 15 mm bend radius: a viable candidate for future compact accelerator magnet application." Superconductor Science and Technology, vol. 31, No. 4, Apr. 1, 2018.

(Continued)

*Primary Examiner* — Sherman Ng
(74) *Attorney, Agent, or Firm* — Blank Rome LLP

(57) ABSTRACT

A round superconductor wire and method for fabricating same are disclosed. Embodiments are directed to a round superconductor wire including at least two superconductor tapes wound on a wire former. Each superconductor tape includes: bottom stabilizer and silver layers; substrate disposed above the bottom silver layer; buffer film stack disposed above the substrate; superconductor film disposed above the buffer film stack; top silver layer disposed above the superconductor film; and top stabilizer layer disposed above the top silver layer. At least one of the bottom stabilizer layer, bottom silver layer, substrate, buffer film stack, superconductor film, top silver layer, or top stabilizer layer is of a different width, thickness, or material composition in one of the superconductor tapes than in another of (Continued)

| Top Stabilizer Layer |
|---|
| Top Ag Layer |
| Superconductor Film |
| Buffer Film Stack |
| Substrate |
| Bottom Ag Layer |
| Bottom Stabilizer Layer | the superconductor tapes. These and other embodiments achieve a round superconductor wire having improved current density in high magnetic field applications when made in small diameters.

18 Claims, 6 Drawing Sheets

(56) References Cited

U.S. PATENT DOCUMENTS

| | | | | |
|---|---|---|---|---|
| 6,591,120 | B1* | 7/2003 | Tanaka | H10N 60/203 |
| | | | | 505/231 |
| 6,828,507 | B1* | 12/2004 | Fritzemeier | C30B 29/16 |
| | | | | 505/231 |
| 2002/0134574 | A1 | 9/2002 | Hughey et al. | |
| 2004/0028886 | A1* | 2/2004 | Inoue | H10N 60/20 |
| | | | | 505/231 |
| 2004/0266628 | A1* | 12/2004 | Lee | H10N 60/0716 |
| | | | | 505/238 |
| 2006/0081307 | A1* | 4/2006 | Field | H10N 60/0184 |
| | | | | 148/98 |
| 2006/0204779 | A1* | 9/2006 | Miyatake | H10N 60/0184 |
| | | | | 428/646 |
| 2009/0298697 | A1* | 12/2009 | Zhang | H10N 60/30 |
| | | | | 505/231 |
| 2010/0173784 | A1* | 7/2010 | Lee | H10N 60/0716 |
| | | | | 428/411.1 |
| 2011/0034338 | A1* | 2/2011 | Goyal | H10N 60/0828 |
| | | | | 977/773 |
| 2012/0065074 | A1* | 3/2012 | Xie | H10N 60/203 |
| | | | | 228/256 |
| 2013/0040820 | A1* | 2/2013 | Selvamanickam | H10N 60/30 |
| | | | | 361/93.1 |
| 2015/0018221 | A1* | 1/2015 | van der Laan | B63G 9/06 |
| | | | | 29/599 |
| 2016/0217890 | A1 | 7/2016 | Kurokawa et al. | |
| 2016/0351781 | A1* | 12/2016 | Seeber | H01B 12/02 |
| 2017/0125924 | A1* | 5/2017 | Lalitha | C22C 28/00 |
| 2018/0151792 | A1 | 5/2018 | Selvamanickam | |

OTHER PUBLICATIONS

Kar, Soumen et al. "Next-generation highly flexible round REBCO STAR wires with over 580 A mm-2 at 4.2 K, 20 T for future compact magnets." Supercond. Sci. Technol. vol. 32 (Aug. 20, 2019) 10LT01. 7 pages. https://doi.org/10.1088/1361-6668-ab3904.

Shen, T. et al. "Stable, predictable and training-free operation of superconducting Bi-2212 Rutherford cable racetrack coils at the wire current density of 1000A/mm2." Scientific Reports, vol. 9, Jul. 15, 2019, pp. 1-9. https://www.nature.com/articles/S41598-019-46629-3.pdf.

International Search report dated May 5, 2020 in counterpart International Application No. PCT/US2019/058355.

International Search report dated Mar. 15, 2021 in counterpart International Application No. PCT/US2020/066760.

Barth, Christian. "Overview: HTS4F Fusion Workshop." Universite de Geneve, Jan. 27, 2014, pp. 1-24.

Van der Laan, D.C. "YBa2Cu3O7-δ coated conductor cabling for low ac-loss and high-field magnet applications." Supercond. Sci. Technol. 22(2009) 065013 pp. 1-5.

Selvamanickam, V. et al. "High Performance 2G Wires: From R&D to Pilot-Scale Manufacturing." IEEE Transactions on Applied Superconductivity, vol. 19, No. 3, Jun. 2009. pp. 3225-3230.

Takayasu, M. et al. "Present Status and Recent Developments of the Twisted Stacked-Tape Cable Conductor." IEEE Transactions on Applied Superconductivity. vol. 26, No. 2, Mar. 2016. 10 pages.

Luo, W. et al. "Fabrication and Electromagnetic Characterization of Ultrasmall Diameter REBCO Wires." IEEE Transactions on Applied Superconductivity. vol. 27, No. Jun. 4, 2017. 5 pages.

Mulder, T. et al. "Development of REBCO-CORC Wires With Current Densities of 400-600 A/mm2 at 10 T and 4.2 K." IEEE Transactions on Applied Superconductivity. vol. 28, No. 3, Mar. 2018. 4 pages.

Fleiter, J. et al. "Electrical characterization of REBCO Reobel cables." 2013 Supercond. Sci. Technol. 26, 065014 doi:10.1088/0953-2048/26/6/065014. 5 pages.

Kar, S. et al. "Ultra-Small Diameter Round REBCO Wire With Robust Mechanical Properties." IEEE Transactions on Applied Superconductivity. vol. 27, No. Jun. 4, 2017. 4 pages.

Luo, W. et al. "Superior critical current of Symmetric Tape Round (STAR) REBCO wires in ulta-high background fields up to 31.2 T." 2018 Supercond. Sci. Technol. 31 12LT01, 8 pages.

Majkic, G. et al. "Engineering current density over 5 kA mm-2 at 4.2 K, 14 T in thick film REBCO tapes." 2018 Supercond. Sci. Technol. 31 10LT01, 8 pages. DOI: 10.1088/1361-6668/aad844.

Van der Laan, D.C. et al. "Record current density of 344 A mm-2 at 4.2 K and 17 T in CORC® accelerator magnet cables." 2016 Supercond. Sci. Techno. 29 055009. doi:10.1088/0953-2048/29/5/055009. 9 pages.

Takayasu, M. et al. "Development of REBCO Twisted Stacked-Tape Cables for Magnet Application." May 21-23, 2014, 1st Workshop on Accelerator Magnets in HTS and DESY, Hamburg, Germany. 27 pages. https://indico.cern.ch/event/308828/contributions/1680713/attachments/589814/811821/WAMHTS-1_Takayasu.pdf.

* cited by examiner

| Top Stabilizer Layer |
| --- |
| Top Ag Layer |
| Superconductor Film |
| Buffer Film Stack |
| Substrate |
| Bottom Ag Layer |
| Bottom Stabilizer Layer |

ROUND SUPERCONDUCTOR WIRES

CROSS REFERENCE TO RELATED APPLICATION(S)

This application is a national phase of PCT/US19/58355, filed Oct. 28, 2019, which claims priority to U.S. provisional patent application No. 62/751,328, filed on Oct. 26, 2018, which is hereby incorporated herein by reference in its entirety.

GOVERNMENT SPONSORSHIP

This invention was made with government support under DE-SC0015983 awarded by U.S. Department of Energy—Small Business Innovation Research (SBIR). The Government has certain rights in the invention.

FIELD

The embodiments disclosed herein are in the field of superconductors. More particularly, the embodiments disclosed herein relate to round superconductor wires and methods of fabricating same, which, inter alia, achieve a round superconductor wire having improved current density in high magnetic field applications when made in small diameters.

BACKGROUND

A promising high temperature superconductor (HTS) candidate for use in accelerator magnets are RE-Ba—Cu—O (REBCO, RE=rare earth) coated conductors that are fabricated by a reel-to-reel thin film process. Two challenges with REBCO coated conductors as compared to Nb—Ti, $Nb_3Sn$, and Bi-2212 wires are associated with their overall flat rather than round cross-sectional geometry and a wide (~12 mm) profile rather than a multifilamentary architecture. To address these issues, globally, there have been recent efforts on high-current multi-strand REBCO cable configurations for accelerator applications such as ROEBEL cables in a rectangular structure, twisted stacked tape cables, and conductor-on-round-core (CORC®) cables/wires. On the other hand, current round RE-Ba—Cu—O (REBCO, RE=rare earth) superconductor wires are limited in engineering current density ($J_e$) levels of about 400 $A/mm^2$ at 20 T when made in diameters less than 2 mm. Problems in degradation of high-performance REBCO tapes when wound to such small diameters are limiting the $J_e$ levels of the round wires.

Therefore, there is a need to achieve increases in the $J_e$ of round REBCO wires to substantially higher levels of about 1000 $A/mm^2$ at 20 T when wound to diameters less than 2 mm.

Thus, it is desirable to provide a round superconductor wire and method of making same that are able to overcome the above disadvantages.

These and other advantages of the present invention will become more fully apparent from the detailed description of the invention herein below.

SUMMARY

Embodiments are directed to a round superconductor wire including at least two superconductor tapes wound on a wire former. Each superconductor tape comprises: a bottom stabilizer layer; a bottom silver layer disposed above the bottom stabilizer layer; a substrate disposed above the bottom silver layer; a buffer film stack disposed above the substrate; a superconductor film disposed above the buffer film stack; a top silver layer disposed above the superconductor film; and a top stabilizer layer disposed above the top silver layer. At least one of the bottom stabilizer layer, bottom silver layer, substrate, buffer film stack, superconductor film, top silver layer, or top stabilizer layer is of a different width, thickness, or material composition in one of the superconductor tapes than in another of the superconductor tapes which is inward from the one superconductor tape, such that the one superconductor tape is an outer superconductor tape and the another superconductor tape is an inner superconductor tape.

In an embodiment, a thickness of the top stabilizer layer in the outer superconductor tape is less than a thickness of the top stabilizer layer in the inner superconductor tape.

In an embodiment, a thickness of the substrate in the outer superconductor tape is greater than a thickness of the substrate in the inner superconductor tape.

In an embodiment, a thickness of the superconductor film in the outer superconductor tape is greater than a thickness of the superconductor film in the inner superconductor tape.

In an embodiment, a thickness of the outer superconductor tape is greater than a thickness of the inner superconductor tape.

In an embodiment, a width of the outer superconductor tape is greater than a width of the inner superconductor tape.

In an embodiment, a copper content in the top stabilizer layer of the inner superconductor tape is greater than a copper content in the top stabilizer layer of the outer superconductor tape.

In an embodiment, a substrate of the inner superconductor tape comprises a nickel content more than 90% and a substrate of the outer superconductor tape comprises a nickel content less than 80%.

In an embodiment, a substrate of the inner superconductor tape comprises stainless steel and a substrate of the outer superconductor tape comprises Hastelloy.

Embodiments are also directed to a method for fabricating a round superconductor wire. The method comprises: winding a first superconductor tape around a wire former; and winding a second superconductor tape around the first superconductor tape. The first superconductor tape and the second superconductor tape each respectively comprise: a bottom stabilizer layer; a bottom silver layer disposed above the bottom stabilizer layer; a substrate disposed above the bottom silver layer; a buffer film stack disposed above the substrate; a superconductor film disposed above the buffer film stack; a top silver layer disposed above the superconductor film; and a top stabilizer layer disposed above the top silver layer. At least one of the bottom stabilizer layer, bottom silver layer, substrate, buffer film stack, superconductor film, top silver layer, or top stabilizer layer is of a different width, thickness, or material composition in the first superconductor tape than in the second superconductor tape.

In an embodiment of the method, a thickness of the top stabilizer layer in the second superconductor tape is less than a thickness of the top stabilizer layer in the first superconductor tape.

In an embodiment of the method, a thickness of the substrate in the second superconductor tape is greater than a thickness of the substrate in the first superconductor tape.

In an embodiment of the method, a thickness of the superconductor film in the second superconductor tape is greater than a thickness of the superconductor film in the first superconductor tape.

In an embodiment of the method, a thickness of the second superconductor tape is greater than a thickness of the first superconductor tape.

In an embodiment of the method, a width of the second superconductor tape is greater than a width of the first superconductor tape.

In an embodiment of the method, a copper content in the top stabilizer layer of the first superconductor tape is greater than a copper content in the top stabilizer layer of the second superconductor tape.

In an embodiment of the method, a substrate of the first superconductor tape comprises a nickel content more than 90% and a substrate of the second superconductor tape comprises a nickel content less than 80%.

In an embodiment of the method, a substrate of the first superconductor tape comprises stainless steel and a substrate of the second superconductor tape comprises Hastelloy.

Embodiments are further directed to a round superconductor wire comprising an engineering current density greater than 450 A/mm² at 4.2 K, 20 T.

In an embodiment, an overall diameter of the round superconductor wire is less than 2.5 mm.

BRIEF DESCRIPTION OF THE DRAWINGS

The foregoing summary, as well as the following detailed description, will be better understood when read in conjunction with the appended drawings. For the purpose of illustration only, there is shown in the drawings certain embodiments. It's understood, however, that the inventive concepts disclosed herein are not limited to the precise arrangements and instrumentalities shown in the figures.

DETAILED DESCRIPTION

Figures 1A, 1B:
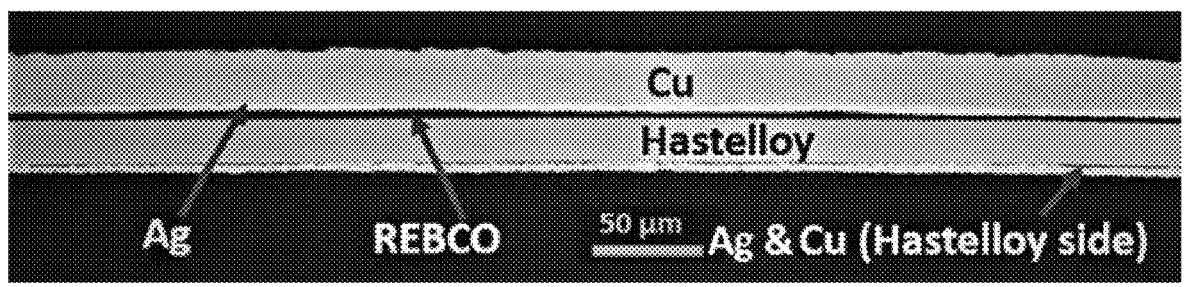
FIG. 1A is a schematic and cross-sectional diagram illustrating a thin symmetric REBCO tape (or REBCO-containing tape), wherein a REBCO film is positioned near the geometric center, close to the neutral plane. The overall tape thickness even with a 20+ μm thick copper stabilizer is small because of the use of a thin (22 μm) Hastelloy substrate. The thin symmetric REBCO tape is one of a plurality of thin symmetric REBCO tapes used to make a round superconductor wire.
FIG. 1B is a schematic and cross-sectional diagram illustrating another one of a plurality of thin symmetric REBCO tapes used to make a round superconductor wire.

It is to be understood that the figures and descriptions of the present invention may have been simplified to illustrate elements that are relevant for a clear understanding of the present embodiments, while eliminating, for purposes of clarity, other elements found in a typical round superconductor wire or typical method of fabricating a round superconductor wire. Those of ordinary skill in the art will recognize that other elements may be desirable and/or required in order to implement the present embodiments. However, because such elements are well known in the art, and because they do not facilitate a better understanding of the present embodiments, a discussion of such elements is not provided herein. It is also to be understood that the drawings included herewith only provide diagrammatic representations of the presently preferred structures of the present invention and that structures falling within the scope of the present embodiments may include structures different than those shown in the drawings. Reference will now be made to the drawings wherein like structures are provided with like reference designations.

Before explaining at least one embodiment in detail, it should be understood that the concepts set forth herein are not limited in their application to the construction details or component arrangements set forth in the following description or illustrated in the drawings. It should also be understood that the phraseology and terminology employed herein are merely for descriptive purposes and should not be considered limiting.

It should further be understood that any one of the described features may be used separately or in combination with other features. Other embodiments of devices, systems, methods, features, and advantages described herein will be or become apparent to one with skill in the art upon examining the drawings and the detailed description herein. It's intended that all such additional devices, systems, methods, features, and advantages be protected by the accompanying claims.

For purposes of this disclosure, the terms "film" and "layer" may be used interchangeably.

For purposes of this disclosure, the phrase "round superconductor wire" may refer to a substantially round superconductor wire.

For purposes of this disclosure, if the term "stabilizer" is mentioned generally (i.e., without the modifiers "bottom" or "top"), it may refer to either the bottom stabilizer or top stabilizer.

This disclosure describes round REBCO wires with improved engineering current density ($J_e$) in high magnetic fields at, for example, liquid helium temperatures. STAR REBCO wires of diameters of 1.6 mm-2 mm (or smaller) have been fabricated using REBCO tapes wherein the REBCO film is positioned near the geometric center reducing its distance to the neutral axis of the tape. Such STAR wires exhibit excellent tolerance to bend strain. This technique leads to substantial improvement in $J_e$ levels of STAR wires by, inter alia, decreasing the degradation of the critical current of these wires when wound into ultra-small diameters especially when using high-performance REBCO tapes.

In aspects of the disclosure, engineering current density ($J_e$) levels of 400-1500 A/mm² at 4.2 K, 20 T may be achieved and which are up to about six-times higher than that achieved by Nb₃Sn round superconductors at 4.2 K, 20 T. Nb₃Sn round superconductors are the only superconductors that are used in high magnetic field applications such as accelerators for high energy physics, fusion reactors and nuclear magnetic resonance (NMR) spectroscopy.

The inventors developed an innovative approach to fabricate round superconductor (e.g., REBCO) wires with high engineering current density ($J_e$) and high tolerance to bending strain. These round superconductor wires may only be 1.6 to 2 mm in overall diameter and are made by winding narrow REBCO (rectangular) tapes on an approximately 1 mm diameter (or less) copper wire former. Such small diameter round superconductor wires are possible by the use of symmetric tapes where the REBCO film is positioned near the geometric center of each wound tape. In other words, in each wound tape, the overall thickness of the combination of the various layers on either side of the centrally located REBCO film is substantial the same. Hence, the tapes are considered symmetric in this respect. Such a symmetric tape architecture is achieved by a strategic selection of the thickness of the top copper stabilizer to minimize the distance between the REBCO film and the neutral axis of the tape, which minimizes bending strains when the round wire is bent into small diameters. The substrate (e.g., Hastelloy, Inconel, Stainless Steel, Nichrome, Ni—W) itself is made thin, about 10-25 μm, so as to enable good tolerance to bending strain. The overall thickness of the REBCO tape is about 30-60 μm including the copper stabilizer (see overall REBCO tape in FIG. 1A). A plurality of these REBCO tapes (e.g., six to eight in number), each about 2.5 mm in width, are wound on a copper wire former to yield a Symmetric Tape Round (STAR) wire. The copper wire former is strong in its axial direction while flexible enough for bending the STAR wire to a small diameter. STAR wires of this disclosure yield a $J_e$ of 407 A/mm² at 20 T and 286 A/mm² at 31.2 T and 4.2 K.

FIG. 1A, by way of example only, is a perspective schematic and cross-sectional diagram illustrating a thin symmetric REBCO tape, wherein a REBCO film is positioned near the geometric center, close to the neutral plane. The overall tape thickness even with a 20+ μm thick top copper stabilizer is small because of the use of a thin (22 μm) Hastelloy substrate. The thin symmetric REBCO tape is one of a plurality of thin symmetric REBCO tapes used to make a round superconductor wire.

FIG. 1B is a schematic and cross-sectional diagram illustrating another one of a plurality of thin symmetric REBCO tapes used to make a round superconductor wire.

Figure 2A:
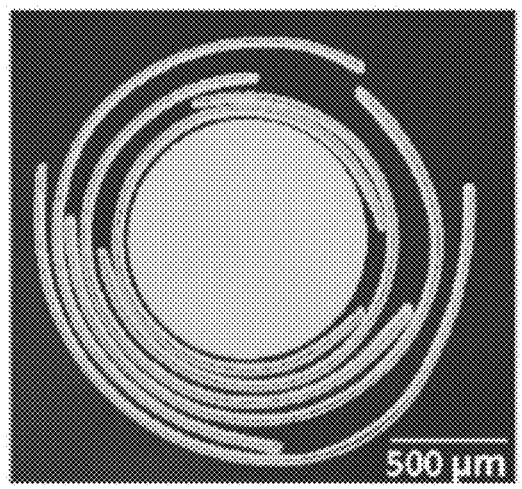
FIG. 2A is a cross-sectional view illustrating a Symmetric Tape Round (STAR) wire.

FIG. 2A, by way of example only, is a cross-sectional view illustrating a Symmetric Tape Round (STAR) wire.

Figure 2B:
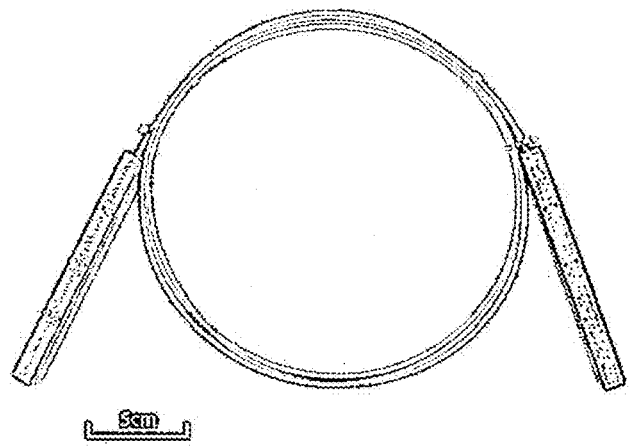
FIG. 2B is a plan view illustrating a 2.01 m long STAR wire.

FIG. 2B, by way of example only, is a plan view illustrating a 2.01 m long STAR wire.

Figure 2C:
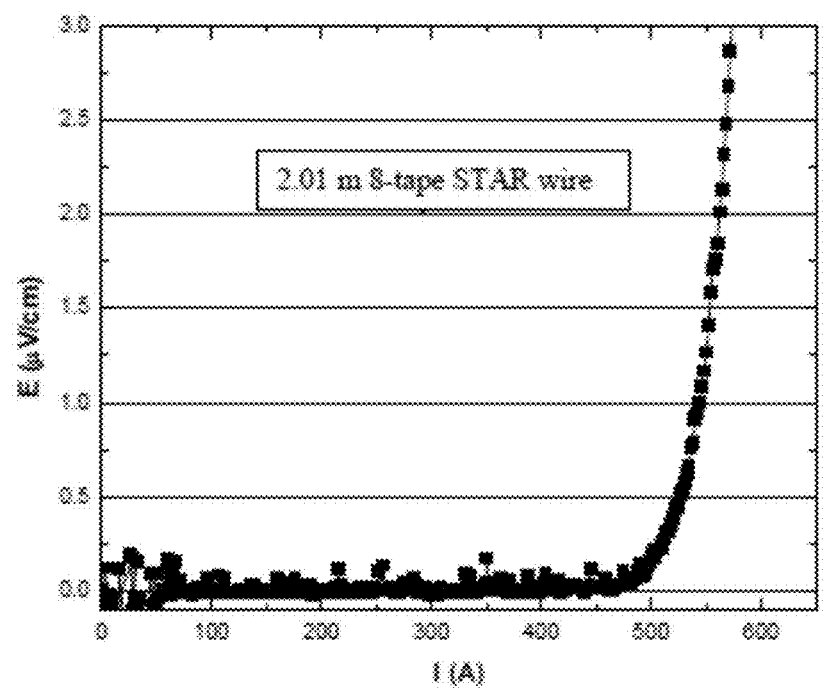
FIG. 2C is a plot illustrating E (in μV/cm) vs. I (in Amps) characteristics of a 2.01 m long STAR wire at 77 K, self-field.

FIG. 2C, by way of example only, is a plot illustrating E (in μV/cm) vs. I (in Amps) characteristics of a 2.01 m long STAR wire at 77 K, self-field.

Figure 3:
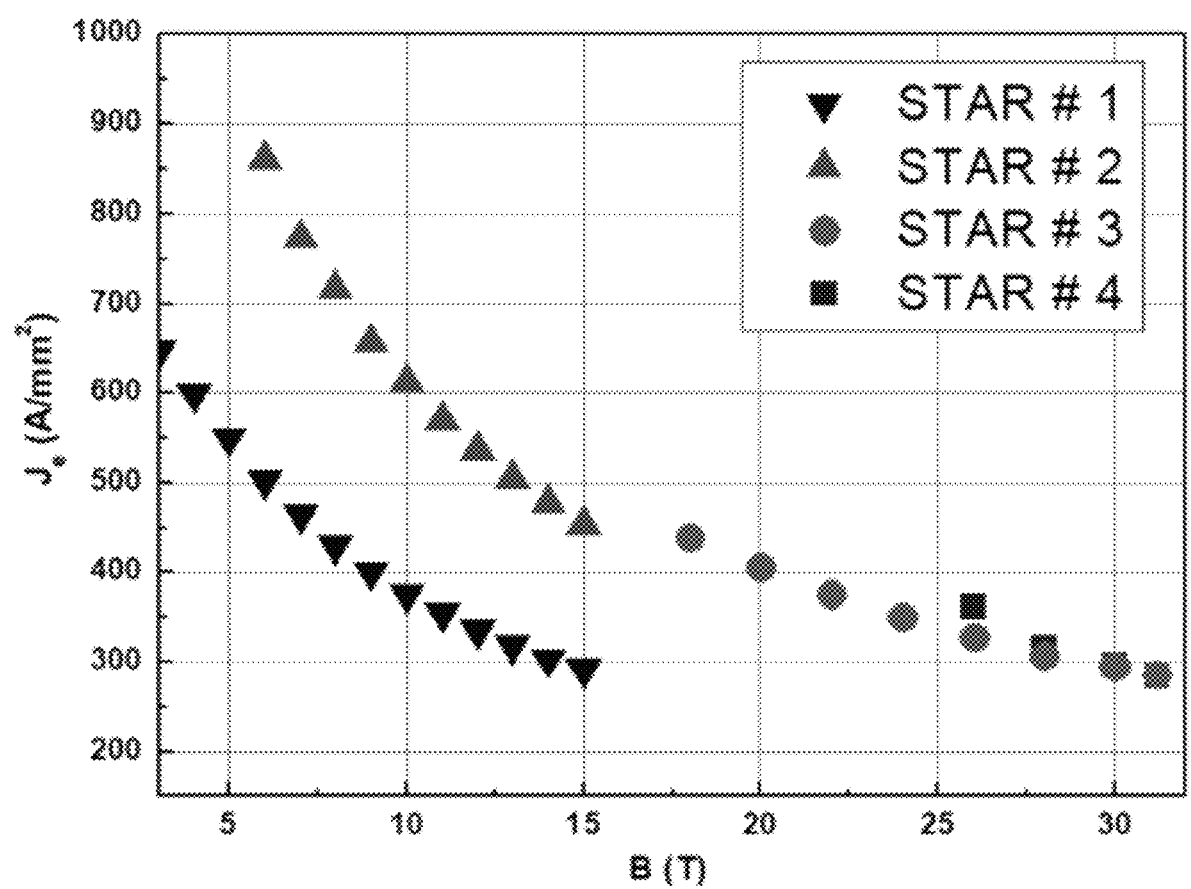
FIG. 3 is a plot illustrating $J_e$ of four STAR wires measured in high magnetic fields at 4.2 K when bent to a radius of 15 mm. STAR wire #3 shows a $J_e$ of 406 A/mm² at 20 T and 286 A/mm² at 31.2 T.

FIG. 3, by way of example only, is a plot illustrating $J_e$ of four STAR wires measured in high magnetic fields at 4.2 K when bent to a radius of 15 mm. STAR wire #3 shows a $J_e$ of 406 A/mm² at 20 T and 286 A/mm² at 31.2 T.

If round REBCO wires can be produced with excellent bend strain tolerance that can meet the stringent bend radius requirement of 15 mm and a $J_e$ at 4.2 K, 20 T of 600 A/mm² now and 1000 A/mm² or more in the near future, REBCO coils made of multiple wound round REBCO wires that enable future high-field accelerator magnets can be produced. A challenge in achieving such high $J_e$ levels is the degradation in the critical current of the round REBCO wires when made to small diameters of about 1.3-2.5 mm. This disclosure describes multiple embodiments to achieve high $J_e$ in round REBCO wires such as those with these small diameters.

Currently, round REBCO wires are made with nearly identical REBCO tapes wound in a spiral fashion over a round former. A key aspect of this disclosure is the use of REBCO tapes of different structural dimensions and/or composition in the different layers of the multiple superconductor tapes that comprise each round REBCO wire. The REBCO tapes of this disclosure are also spirally wound over a round former. An embodiment of this invention is a (e.g., steady) change in the structure of the REBCO tapes from the inner REBCO tape to the outer REBCO tape of a round REBCO-containing wire. Some layers/structures within a REBCO tape may not change from corresponding layers/structures in the previous underlying REBCO tape (e.g., in any of the embodiments below). The following different structures of REBCO tapes are disclosed:

a. Thickness of copper stabilizer on the REBCO film side.
   b. Thickness of silver layer(s).
   c. Thickness of substrate.
   d. Thickness of REBCO film.
   e. Width of REBCO tape.

Embodiment 1

The REBCO tape structures that are used to make the round superconductor wires of the disclosure have been optimized based on the former diameter. Previously, the minimal copper stabilizer thickness that results in about 90 to 95% retention of the critical current of the innermost REBCO tape in a flat form was experimentally determined and used for the rest of the REBCO tapes. In the present disclosure, the copper thickness is varied in each of the tapes of the round superconductor wire. In an embodiment, the copper stabilizer thickness is steadily decreased from the tape used in the first REBCO tape (closest to the wire former) to the outermost REBCO tape. The top copper stabilizer thickness is decreased according to the diameter of each REBCO tape of the wire as shown in FIG. 4.

Figure 4:
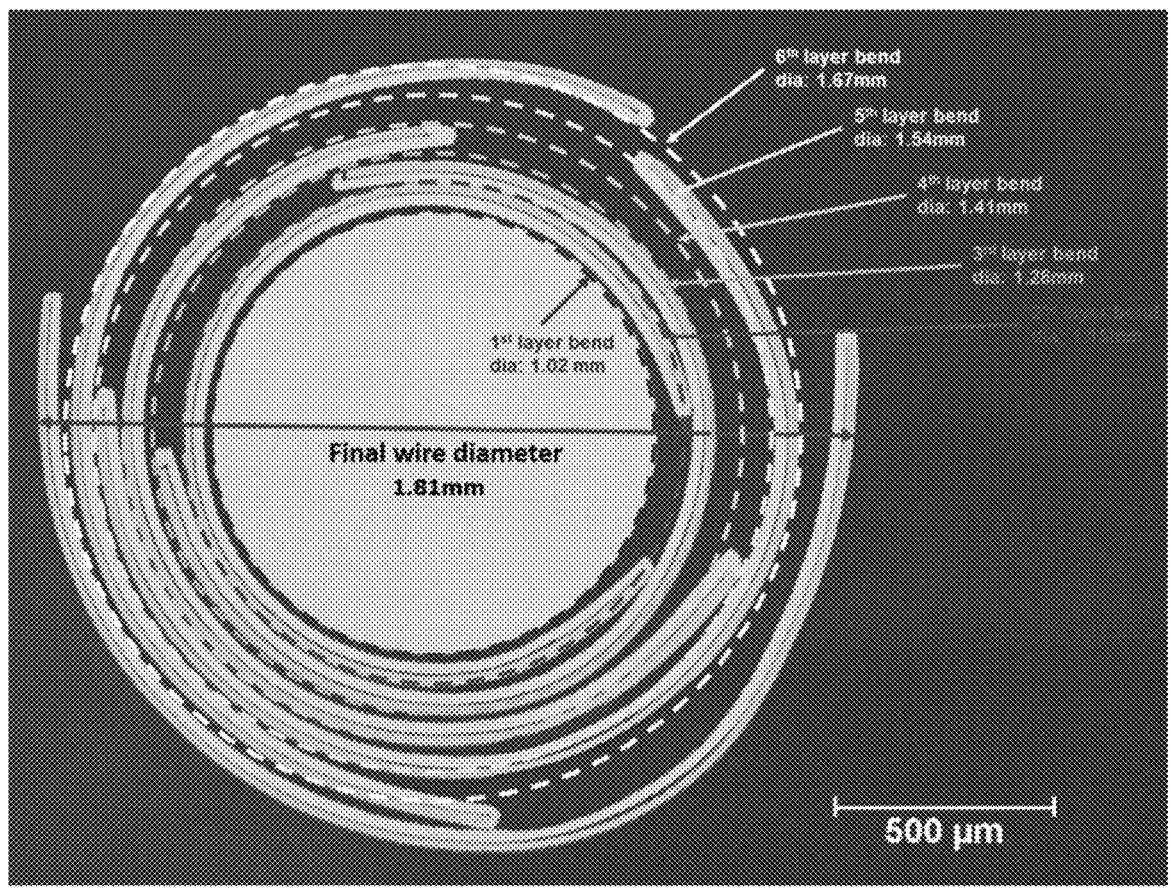
FIG. 4 is a cross-sectional view illustrating the STAR wire shown in FIG. 2A, with indicated diameters of each of the six REBCO tapes used to fabricate the STAR wire (i.e., round REBCO-containing wire) starting with a copper wire former diameter of 1.02 mm (AWG18 wire).

FIG. 4, by way of example only, is a cross-sectional view illustrating the STAR wire shown in FIG. 2A, with indicated diameters of each of the six REBCO (or REBCO-containing) tapes used to fabricate the STAR wire (i.e., round REBCO-containing wire) starting with a copper wire former diameter of 1.02 mm (AWG18 wire).

Table 1 below provides an example of the top copper stabilizer thicknesses for the six REBCO tapes of a round REBCO wire (with reference to, for example, FIG. 4) that are wound starting with a 1.02 mm former diameter assuming that the REBCO tapes consist of Hastelloy C276 substrate of 15-22 μm thickness and a yield strength of 830 MPa. As shown in Table 1, a round REBCO wire comprising tapes of a constant thickness (32 μm) of top copper stabilizer yields an engineering current density ($J_e$) of 293 A/mm² at 77 K in zero magnetic field. Whereas, a round REBCO wire comprising tapes of varying thicknesses of copper stabilizer yields an improved/higher engineering current density ($J_e$) of 320 A/mm² at 77 K in zero magnetic field. Based on a lift factor of 2.25, the engineering current density ($J_e$) of this wire at 4.2 K, 20 T is expected to be 720 A/mm². Lift factor is the ratio of the critical current at a temperature lower than 77 K in an applied magnetic field to the critical current at 77 K in zero magnetic field.

TABLE 1

Copper stabilizer thicknesses for the six REBCO tapes of the round REBCO wire that are wound (with reference to, for example, FIG. 4)

| Tape number | $1^{st}$ | $2^{nd}$ | $3^{rd}$ | $4^{th}$ | $5^{th}$ | $6^{th}$ | Final wire OD | $J_e$ based on 600A |
|---|---|---|---|---|---|---|---|---|
| Optimal Cu thickness [μm] | 32 | 25 | 18 | 12 | 5 | 0 | | |
| Bend diameter of the tape [mm] | 1.02 | 1.14 | 1.25 | 1.34 | 1.43 | 1.49 | 1.55 | 320 A/mm² |
| Using a constant Cu thickness per tape of 32 μm (total tape thickness is 61 μm) | | | | | | | 1.62 | 293 A/mm² |

It is seen from Table 1 that one benefit of using less thickness of top copper stabilizer in the outer tapes of the wire is the smaller overall diameter which leads to higher engineering current density ($J_e$). Additionally, it is expected that the bend strain levels in the wire will be significantly reduced with an optimized copper stabilizer thickness in each of the tapes.

Embodiment 2

The typical thickness of the substrate used in superconductor tapes in STAR REBCO wires is about 22 μm. Rather than using superconductor tapes with a constant thickness of the substrate, the inventors have discovered an improvement in the retention of critical current of round REBCO wires if a superconductor tape with a thinner substrate is used in the innermost tape (closest to the wire former) and superconductor tapes with progressively thicker substrates are utilized in the outer tapes. A general range of thickness of substrates in superconductor tapes is 15-30 μm and preferably in the range of 18-25 μm.

Embodiment 3

The typical thickness of REBCO films in tapes used in the fabrication of round REBCO wires is approximately 1.7 μm. Recently, REBCO tapes with a REBCO film thickness of 4-5 μm have been fabricated with substantially higher critical currents. These tapes exhibit critical currents as high as 2000 A/4 mm at 4.2 K, 15 T, which is more than a factor of 5 higher than that of typical REBCO tapes used in round wires used so far. If REBCO tapes with thicker REBCO films are used in the inner tapes, those tapes experience a significant degradation in critical current. Hence, in this embodiment, REBCO tapes with thicker REBCO films are used in the outer tapes of the round wire (versus thinner REBCO films in the inner tapes). In one example, REBCO tapes with REBCO films less than 2 μm are used in the inner two tapes and REBCO films greater than 4 μm thickness are used in the third tape onwards. In another example, REBCO tapes with REBCO films less than 2 μm are used in the inner two tapes and a REBCO film of 2-3 μm thickness is used in the third tape, a REBCO film of 3-4 μm thickness is used in the fourth tape, and REBCO films greater than 4 μm thickness are used in the fifth tape onwards. The above examples are not shown in Table 2 below. Table 2 below shows the capability to achieve overall higher critical current ($I_c$) in round REBCO wires (with reference to, for example, FIG. 4) if a varying thickness of the REBCO film is used in the tapes of each of the round REBCO wire. In Table 2, all REBCO tapes are 2.5 mm in width. A round REBCO wire with a critical current of 1,088 A at 77 K in zero magnetic field as shown in Table 2 will have critical current of about 2,450 A at 4.2 K in a magnetic field of 20 T assuming a Lift Factor of 2.25. Based on a wire diameter of 1.6 mm, this critical current correspond to an engineering current density ($J_e$) of 1,220 A/mm² at 4.2 K, 20 T.

TABLE 2

REBCO film thicknesses for the six REBCO tapes of the round REBCO wire that are wound (with reference to, for example, FIG. 4), achieving overall higher critical current ($I_c$) in the round REBCO wire

| | $1^{st}$ tape | $2^{nd}$ tape | $3^{rd}$ tape | $4^{th}$ tape | $5^{th}$ tape | $6^{th}$ tape | Total wire |
|---|---|---|---|---|---|---|---|
| Film thickness (μm) | 1.7 | 1.7 | 1.7 | 1.7 | 1.7 | 1.7 | |
| Tape $I_c$ (A) | 83 | 94 | 99 | 104 | 104 | 104 | 588 |
| Film thickness (μm) | 2.5 | 2.5 | 2.5 | 2.5 | 2.5 | 2.5 | |
| Tape $I_c$ (A) | 107 | 130 | 138 | 146 | 153 | 153 | 827 |
| Film thickness (μm) | 3.5 | 3.5 | 3.5 | 3.5 | 3.5 | 3.5 | |
| Tape $I_c$ (A) | 97 | 122 | 161 | 193 | 204 | 214 | 991 |
| Film thickness (μm) | 4.5 | 4.5 | 4.5 | 4.5 | 4.5 | 4.5 | |
| Tape $I_c$ (A) | 83 | 110 | 138 | 179 | 234 | 262 | 1006 |
| Film thickness (μm) | 2.5 | 2.5 | 3.5 | 3.5 | 4.5 | 4.5 | |
| Tape $I_c$ (A) | 107 | 130 | 161 | 193 | 234 | 262 | 1087 |

Embodiment 4

Round REBCO wires having diameters of 1.5-2 mm are made with a constant REBCO tape width of about 2.5 mm. In this embodiment, round REBCO wires are each made with REBCO tapes each of varying width from 2 mm in the first tape to 3.3 mm in the sixth tape. Table 3 below shows examples of three round superconductor wires (with reference to, for example, FIG. 4). The first round superconductor wire was made with all six REBCO tapes of a constant width of 2.5 mm in all tapes. The second round superconductor wire was made with REBCO tapes of 2.5 mm width in the first four tapes and 3 mm width in the last/outermost two tapes. The third round superconductor wire was made with REBCO tapes of different widths from 2.5 mm in the innermost wound REBCO tape to 3.3 mm in the outermost wound REBCO tape. A higher critical current ($I_c$) is achieved in the round superconductor wire made with varying REBCO tape widths. The REBCO films of each of the REBCO tapes used in the three examples are 1.7 μm in thickness.

TABLE 3

Varying Widths for the six REBCO tapes of the round REBCO wire that are wound (with reference to, for example, FIG. 4), achieving overall higher critical current ($I_c$) in the round REBCO wire

| | $1^{st}$ tape | $2^{nd}$ tape | $3^{rd}$ tape | $4^{th}$ tape | $5^{th}$ tape | $6^{th}$ tape |
|---|---|---|---|---|---|---|
| Tape width (mm) | 2.5 | 2.5 | 2.5 | 2.5 | 2.5 | 2.5 |

TABLE 3-continued

Varying Widths for the six REBCO tapes of the round REBCO wire that are wound (with reference to, for example, FIG. 4), achieving overall higher critical current ($I_c$) in the round REBCO wire

| | 1st tape | 2nd tape | 3rd tape | 4th tape | 5th tape | 6th tape | Total wire |
|---|---|---|---|---|---|---|---|
| Tape $I_c$ (A) | 83 | 94 | 99 | 104 | 104 | 104 | 588 |
| Tape width (mm) | 2.5 | 2.5 | 2.5 | 2.5 | 3 | 3 | |
| Tape $I_c$ (A) | 83 | 94 | 99 | 104 | 125 | 125 | 630 |
| Tape width (mm) | 2.5 | 2.5 | 2.8 | 2.8 | 3 | 3.3 | |
| Tape $I_c$ (A) | 83 | 94 | 111 | 116 | 125 | 138 | 667 |

Further embodiments of this invention include round superconductor wires each made with REBCO tapes of different material composition for the stabilizer and substrate in the different tapes. For example, the content of copper in the stabilizer could be varied from 100% to less than 50% in the tapes used to fabricate the round wire. The remainder content of the stabilizer could be Zn, Sn, and/or Ni. For instance, the copper content in the stabilizer layer of the innermost tape can be close to 100% and decrease to lower values in the stabilizer layer of the outermost tape. Correspondingly, the yield strength of the copper stabilizer could be as low as 30 MPa in the innermost tape and increase to as high as 1000 MPa in the outermost tape. Alternately, substrates of different composition could be used in the tapes to fabricate the round wire. For example, the content of Ni, Cr, Fe could be varied in the substrates of the different tapes used to fabricate the round wire. For instance, the substrate of the innermost tape could be made of a Ni alloy with a nickel content more than 90% and the substrate of the outermost tape could be made of a Ni alloy with a nickel content less than 80%. Alternately, the innermost tape could be made with a stainless steel substrate and the outermost tape could be made with a Hastelloy substrate. Correspondingly, the yield strength of the substrate could be as low as 100 MPa in the innermost tape and increase to as high as 1500 MPa in the outermost tape. The different compositions of the stabilizer or substrate in the tapes used to fabricate the round wire will result in differences in mechanical properties such as stiffness and yield strength as noted above. Round wires made with tapes of different compositions will then yield superior mechanical properties and in turn more tolerance to bend strain and in turn a higher retention of the engineering current density ($J_e$).

Embodiments are directed to a round superconductor wire including at least two superconductor tapes wound on a wire former. Each superconductor tape comprises: a bottom stabilizer layer; a bottom silver layer disposed above the bottom stabilizer layer; a substrate disposed above the bottom silver layer; a buffer film stack disposed above the substrate; a superconductor film disposed above the buffer film stack; a top silver layer disposed above the superconductor film; and a top stabilizer layer disposed above the top silver layer. At least one of the bottom stabilizer layer, bottom silver layer, substrate, buffer film stack, superconductor film, top silver layer, or top stabilizer layer is of a different width, thickness, or material composition in one of the superconductor tapes than in another of the superconductor tapes which is inward from the one superconductor tape, such that the one superconductor tape is an outer superconductor tape and the another superconductor tape is an inner superconductor tape. In an embodiment, a thickness of the top stabilizer layer in the outer superconductor tape is less than a thickness of the top stabilizer layer in the inner superconductor tape. In another embodiment, a thickness of the substrate in the outer superconductor tape is greater than a thickness of the substrate in the inner superconductor tape. In yet another embodiment, a thickness of the superconductor film in the outer superconductor tape is greater than a thickness of the superconductor film in the inner superconductor tape. In yet another embodiment, a thickness of the outer superconductor tape is greater than a thickness of the inner superconductor tape. In yet another embodiment, a width of the outer superconductor tape is greater than a width of the inner superconductor tape. In yet another embodiment, a copper content in the top stabilizer layer of the inner superconductor tape is greater than a copper content in the top stabilizer layer of the outer superconductor tape. In yet another embodiment, a substrate of the inner superconductor tape comprises a nickel content more than 90% and a substrate of the outer superconductor tape comprises a nickel content less than 80%. In a further embodiment, a substrate of the inner superconductor tape comprises stainless steel and a substrate of the outer superconductor tape comprises Hastelloy.

Figure 5:
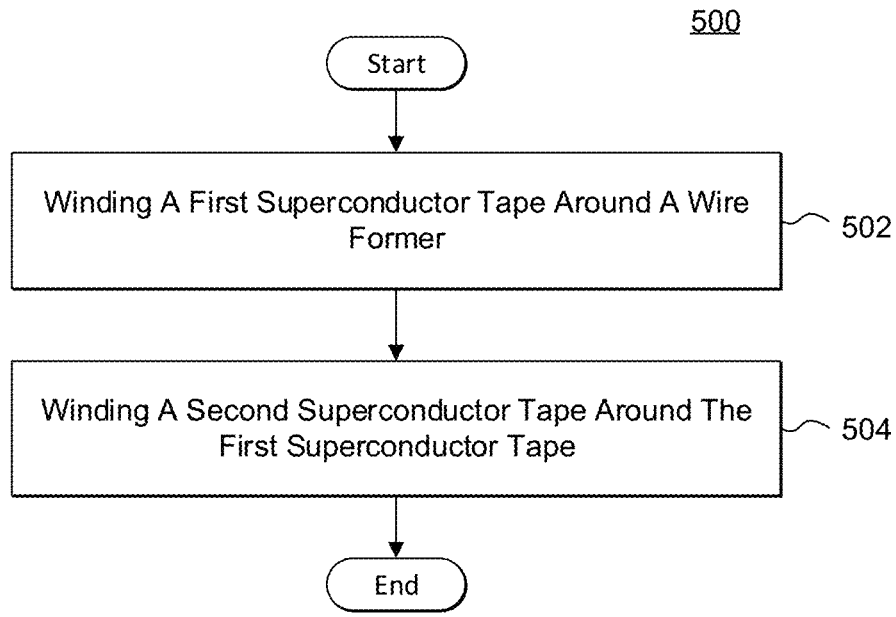
FIG. 5 is a flowchart illustrating an embodiment of a method of fabricating a round superconductor wire, in accordance with an embodiment.

By way of example only, FIG. 5 is a flowchart illustrating an embodiment of a method 500 of fabricating a round superconductor wire. In an embodiment, the method 500 comprises winding a first superconductor tape around a wire former (block 502); and winding a second superconductor tape around the first superconductor tape (block 504). This winding (i.e., block 504) covers the situation where the second superconductor tape may or may not be in direct contact with the first superconductor tape. For example, other superconductor tapes may be between the first and second superconductor tapes. The first superconductor tape and the second superconductor tape each respectively comprise: a bottom stabilizer layer; a bottom silver layer disposed above the bottom stabilizer layer; a substrate disposed above the bottom silver layer; a buffer film stack disposed above the substrate; a superconductor film disposed above the buffer film stack; a top silver layer disposed above the superconductor film; and a top stabilizer layer disposed above the top silver layer. At least one of the bottom stabilizer layer, bottom silver layer, substrate, buffer film stack, superconductor film, top silver layer, or top stabilizer layer is of a different width, thickness, or material composition in the first superconductor tape than in the second superconductor tape. In an embodiment of the method, a thickness of the top stabilizer layer in the second superconductor tape is less than a thickness of the top stabilizer layer in the first superconductor tape. In another embodiment of the method, a thickness of the substrate in the second superconductor tape is greater than a thickness of the substrate in the first superconductor tape. In yet another embodiment of the method, a thickness of the superconductor film in the second superconductor tape is greater than a thickness of the superconductor film in the first superconductor tape. In yet another embodiment of the method, a thickness of the second superconductor tape is greater than a thickness of the first superconductor tape. In yet another embodiment of the method, a width of the second superconductor tape is greater than a width of the first superconductor tape. In yet another embodiment of the method, a copper content in the top stabilizer layer of the first superconductor tape is greater than a copper content in the top stabilizer layer of the second superconductor tape. In yet another embodiment of the method, a substrate of the first superconductor tape comprises a nickel content more than 90% and a substrate of the second superconductor tape comprises a nickel content less than 80%. In a further embodiment of the method, a substrate of the first superconductor tape comprises stainless steel and a substrate of the second superconductor tape comprises Hastelloy.

Embodiments are further directed to a round superconductor wire comprising an engineering current density greater than 450 A/mm$^2$ at 4.2 K, 20 T. In an embodiment, an overall diameter of the round superconductor wire is less than 2.5 mm.

Example of One Embodiment

Figure 6:
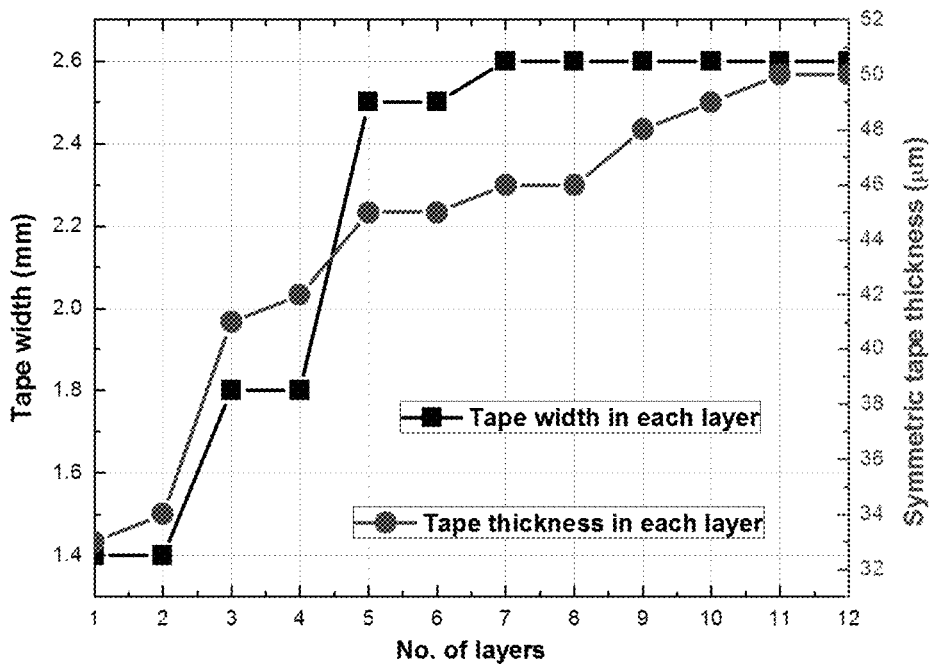
FIG. 6 is a plot illustrating width and thickness distribution of symmetric REBCO tapes used in a STAR wire, in accordance with an example of an embodiment.

FIG. 6 illustrates an example of a STAR wire fabricated with the thickness and width of the symmetric tapes varied in each layer. Thinner and narrower tapes with 32 μm total thickness and 1.4 mm widths were wound in the inner layers of the wire, while thicker and wider tapes with 50 μm overall thickness and 2.6 mm widths were wound in the outer layers of the wire.

A total of 12 layers were used to fabricate this STAR wire on a 0.51 mm diameter copper former. The outer diameter of this wire was 2.04 mm. This wire exhibited a critical current of 1,396 A at 4.2 K, 24 T which is the highest critical current achieved in a round (approximately) 2 mm diameter REBCO wire. This critical current value corresponds to an engineering current density ($J_e$) of 427 A/mm$^2$ at 4.2 K, 24 T. This result shows a benefit of this disclosure of using tapes of variable thickness and variable width to achieve high critical currents in round REBCO wires.

Figure 7:
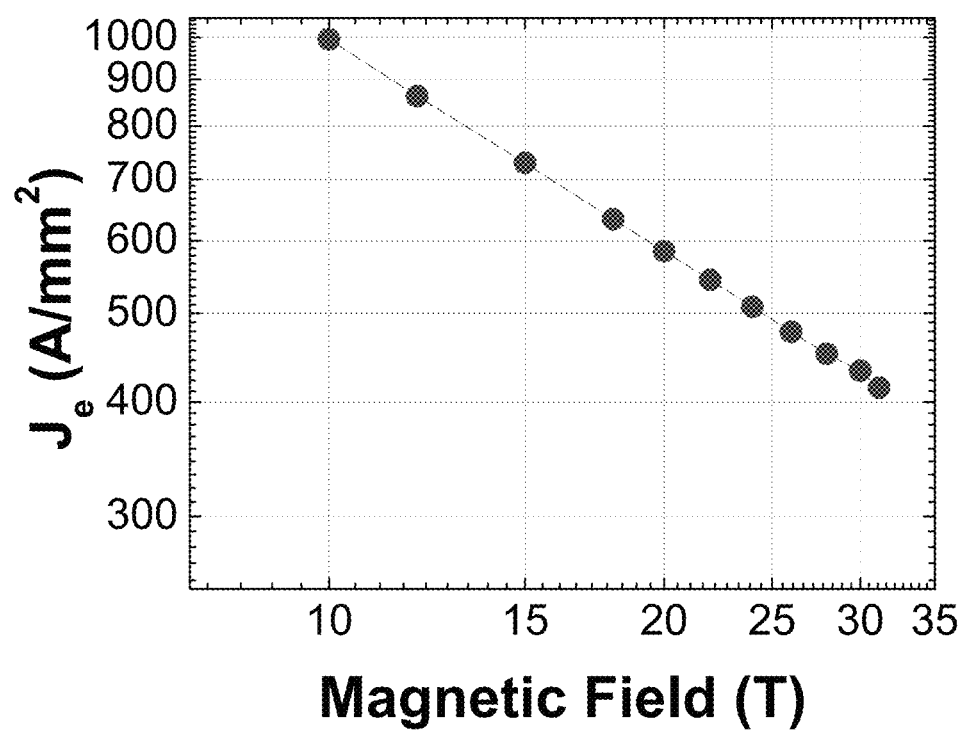
FIG. 7 is a plot illustrating $J_e$ of a STAR wire made with symmetric REBCO tapes of different thickness and widths from the inner layer to the outer layer measured in high magnetic fields at 4.2 K when bent to a radius of 15 mm. This STAR wire shows a $J_e$ of 586 A/mm² at 20 T.

Another STAR wire with an overall diameter of 1.3 mm was fabricated with six layers of symmetric REBCO tapes. Two tapes of 1.4 mm width each and 33-34 μm overall thickness were used in the inner two layers, two tapes 1.8 mm width and 41-42 μm overall thickness were used in the middle two layers, and two tapes 2.5 mm width and 45 μm overall thickness were used in the outer two layers. As shown in FIG. 7, this round wire exhibited an engineering current density ($J_e$) of 586 A/mm$^2$ at 4.2 K, 20 T.

Although embodiments are described above with reference to REBCO tapes comprising REBCO superconductor films, the REBCO superconductor films described in any of the above embodiments may alternatively be superconductor films comprising different superconductor material(s). Such alternative is considered to be within the spirit and scope of the present invention, and may therefore utilize the advantages of the configurations and embodiments described above.

The method steps in any of the embodiments described herein are not restricted to being performed in any particular order. Also, structures mentioned in any of the method embodiments may utilize structures mentioned in any of the device embodiments. Such structures may be described in detail with respect to the device embodiments only but are applicable to any of the method embodiments.

Features in any of the embodiments described above may be employed in combination with features in other embodiments described above, such combinations are considered to be within the spirit and scope of the present invention.

The contemplated modifications and variations specifically mentioned above are considered to be within the spirit and scope of the present invention.

It's understood that the above description is intended to be illustrative, and not restrictive. The material has been presented to enable any person skilled in the art to make and use the concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the embodiments herein therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A round superconductor wire including at least two superconductor tapes wound on a wire former, each superconductor tape comprising:
    a bottom stabilizer layer;
    a bottom silver layer disposed above the bottom stabilizer layer;
    a substrate disposed above the bottom silver layer;
    a buffer film stack disposed above the substrate;
    a superconductor film disposed above the buffer film stack;
    a top silver layer disposed above the superconductor film; and
    a top stabilizer layer disposed above the top silver layer;
    wherein at least one of the bottom stabilizer layer, bottom silver layer, substrate, buffer film stack, superconductor film, top silver layer, or top stabilizer layer is of a different width, thickness, or material composition in one of the superconductor tapes than in another of the superconductor tapes which is inward from the one superconductor tape, such that the one superconductor tape is an outer superconductor tape and the another superconductor tape is an inner superconductor tape.

2. The round superconductor wire of claim 1, wherein a thickness of the top stabilizer layer in the outer superconductor tape is less than a thickness of the top stabilizer layer in the inner superconductor tape.

3. The round superconductor wire of claim 1, wherein a thickness of the substrate in the outer superconductor tape is greater than a thickness of the substrate in the inner superconductor tape.

4. The round superconductor wire of claim 1, wherein a thickness of the superconductor film in the outer superconductor tape is greater than a thickness of the superconductor film in the inner superconductor tape.

5. The round superconductor wire of claim 1, wherein a thickness of the outer superconductor tape is greater than a thickness of the inner superconductor tape.

6. The round superconductor wire of claim 1, wherein a width of the outer superconductor tape is greater than a width of the inner superconductor tape.

7. The round superconductor wire of claim 1, wherein a copper content in the top stabilizer layer of the inner superconductor tape is greater than a copper content in the top stabilizer layer of the outer superconductor tape.

8. The round superconductor wire of claim 1, wherein a substrate of the inner superconductor tape comprises a nickel content more than 90% and a substrate of the outer superconductor tape comprises a nickel content less than 80%.

9. The round superconductor wire of claim 1, wherein a substrate of the inner superconductor tape comprises stainless steel and a substrate of the outer superconductor tape comprises Hastelloy.

10. A method for fabricating a round superconductor wire, the method comprising:

winding a first superconductor tape around a wire former; and winding a second superconductor tape around the first superconductor tape;

wherein the first superconductor tape and the second superconductor tape each respectively comprise:
- a bottom stabilizer layer;
- a bottom silver layer disposed above the bottom stabilizer layer;
- a substrate disposed above the bottom silver layer;
- a buffer film stack disposed above the substrate;
- a superconductor film disposed above the buffer film stack;
- a top silver layer disposed above the superconductor film; and
- a top stabilizer layer disposed above the top silver layer; and wherein at least one of the bottom stabilizer layer, bottom silver layer, substrate, buffer film stack, superconductor film, top silver layer, or top stabilizer layer is of a different width, thickness, or material composition in the first superconductor tape than in the second superconductor tape.

11. The method of claim 10, wherein a thickness of the top stabilizer layer in the second superconductor tape is less than a thickness of the top stabilizer layer in the first superconductor tape.

12. The method of claim 10, wherein a thickness of the substrate in the second superconductor tape is greater than a thickness of the substrate in the first superconductor tape.

13. The method of claim 10, wherein a thickness of the superconductor film in the second superconductor tape is greater than a thickness of the superconductor film in the first superconductor tape.

14. The method of claim 10, wherein a thickness of the second superconductor tape is greater than a thickness of the first superconductor tape.

15. The method of claim 10, wherein a width of the second superconductor tape is greater than a width of the first superconductor tape.

16. The method of claim 10, wherein a copper content in the top stabilizer layer of the first superconductor tape is greater than a copper content in the top stabilizer layer of the second superconductor tape.

17. The method of claim 10, wherein a substrate of the first superconductor tape comprises a nickel content more than 90% and a substrate of the second superconductor tape comprises a nickel content less than 80%.

18. The method of claim 10, wherein a substrate of the first superconductor tape comprises stainless steel and a substrate of the second superconductor tape comprises Hastelloy.

* * * * *